ROTATING BEAM SPACE-CHARGE WAVE PARAMETRIC AMPLIFIER

Filed Oct. 27, 1960 3 Sheets-Sheet 1

INVENTOR
W. W. RIGROD
BY David P. Kelley
ATTORNEY

ROTATING BEAM SPACE-CHARGE WAVE PARAMETRIC AMPLIFIER

Filed Oct. 27, 1960 3 Sheets-Sheet 2

INVENTOR
W. W. RIGROD
BY David P. Kelley
ATTORNEY

INVENTOR
W. W. RIGROD
BY David P. Kelley
ATTORNEY

United States Patent Office 3,051,910

Patented Aug. 28, 1962

3,051,910
ROTATING BEAM SPACE-CHARGE WAVE PARAMETRIC AMPLIFIER

William W. Rigrod, Millington, N.J., assignor to Bell Telephone Laboratories, Incorporated, New York, N.Y., a corporation of New York Filed Oct. 27, 1960, Ser. No. 65,310
6 Claims. (Cl. 330—43)

This invention relates to electron beam devices and more particularly to space-charge wave parametric amplifiers.

The term "parametric amplifier" in general refers to a family of electrical devices wherein amplification is achieved through the periodic variation of a circuit parameter. It has been found that this principle can be applied to electron beam devices to achieve unprecedented low noise figures for such devices because it enables the direct removal of noise energy from the electron beam.

In the conventional traveling wave tube, amplification takes place through signal wave interaction with slow space-charge waves, that is, beam waves produced by charge density modulations which propagate at phase velocities less than the D.-C. velocity of the beam. It has been recognized that beam energy propagating as a slow space-charge wave is at a lower kinetic energy level than that of the D.-C. unmodulated beam. Beam noise energy that travels along the beam as a slow space-charge wave cannot therefore be extracted by any external circuit.

Through the principles of parametric amplification, a beam device may be operated in the fast space-charge mode. Energy propagating as a fast space-charge wave is at a higher kinetic energy level than the unmodulated beam and can be conveniently extracted. Hence, in a space-charge wave parametric amplifier, fast space-charge wave noise energy is extracted from the beam, a signal wave is caused to propogate along the beam as a fast space-charge wave, the fast space-charge wave signal energy is parametrically amplified and then removed with a relatively low noise content. Power for signal amplification is derived from pump frequency energy which is caused to mix with the signal space-charge wave.

One characteristic of a space-charge wave modulated beam that is often a drawback is its relatively low dispersion. This means that the phase velocities of the various fast space-charge waves vary only slightly with frequency. As explained in the patent of Ashkin et al., Patent No. 2,958,001 issued October 25, 1960, the mixing of the pump and signal waves defines a series of upper sideband frequency waves which may couple to the growing signal wave because the differences of phase velocity between the various waves are relatively small. The Ashkin et al. device solves this problem through the use of an auxiliary non-propagating slow wave circuit that shifts the effective phase velocities of certain upper sideband frequency waves.

Another device that defeats the upper sideband problem is described in the paper of Adler et al., "The Quadrupole Amplifier, a Low-Noise Parametric Device," Proceedings of the Institute of Radio Engineers, volume 47, No. 10, page 1713, October 1959. This device utilizes the cyclotron principle that if a force is applied to an electron in a uniform magnetic field, and if the force is transverse to the magnetic field, the electron will gyrate in an orbit whose radius is proportional to the applied force. By applying transverse electric fields to a magnetically focused electron beam, one can modulate the radii of gyration of successive electrons and thereby define a beam wave known as a cyclotron wave. A signal cyclotron wave can then be amplified by R.F. pump energy that excites a quadrupole structure. The pump frequency is synchronized with the cyclotron wave so that, when the beam flows through the quadrupole, the radii of gyration of the electrons grow with distance and the cyclotron wave is amplified. It can be shown that a cyclotron wave modulated beam is highly dispersive and so the upper sideband frequency waves are so far out of synchronism with signal wave that they cannot effectively couple thereto.

Certain disadvantages also inhere in the Adler et al. device. The gain of the device is limited by several factors: a thin electron beam must be used, and therefore beam current is limited; signal wave amplification is accompanied by beam expansion which must be kept within fairly narrow limits to prevent beam impingement on the quadrupole; the pump fields of the quadrupole do not penetrate the beam uniformly and the efficiency of the quadrupole is therefore relatively low. Further, the quadrupole must be very carefully aligned to maximize efficiency while minimizing beam impingement.

I have found that, through the use of certain new concepts, it is possible to make a space-charge wave modulated electron beam highly dispersive without thereby introducing the disadvantages of cyclotron wave interaction, and that such a dispersive electron beam can be used in a parametric amplifier of simple structure to attain efficient, low-noise amplification.

Accordingly, it is a general object of this invention to provide low noise amplification of high frequency electromagnetic waves.

It is another object of this invention to provide high-power, high-efficiency and high-gain amplification of electromagnetic waves.

It is a further object of this invention to provide parametric amplification of electromagnetic waves through the use of a beam device of simple and easily fabricated structure.

It is a specific object of this invention to prevent upper sideband frequency beam waves from coupling with the growing signal wave in a space-charge wave parametric amplifier.

These and other objects of this invention are attained in an illustrative embodiment thereof comprising an evacuated envelope with a cathode and a collector at opposite ends. An input circuit modulates the beam in the fast space-charge mode with signal frequency energy and extracts fast space-charge noise wave energy from the beam. A pump circuit couples high frequency pump energy to the fast space-charge mode of the beam and thereby causes the fast signal space-charge wave to become parametrically amplified. An output circuit extracts the amplified signal energy from the beam whereupon it is transmitted to an appropriate load.

It is a feature of this invention that a uniform rotational velocity component be imparted to the beam prior to modulaton and that all beam modulation be produced by electric fields that are transverse to the path of flow of the electron beam. The conventional method of modulating a beam in the space-charge mode is to produce longitudinal or axial electric fields along the beam, that is, electric fields parallel with the direction of beam flow. By giving the beam an initial twist so that all of the electrons gyrate around the central axis of the beam, it is possible to produce charge density modulations (space-charge waves) by the forces of transverse electric fields. When this is done, the compressions and rarefactions of charge density defining the space-charge waves travel in helical paths to the collector. Under these conditions the beam acts as a periodic circuit with respect to the input, pump and output circuits. Hence, the electric fields of these circuits which propagate in the axial direction will "see" harmonics of the space-charge waves which have different axial phase velocities than those of the fundamental space-charge waves traveling in helical paths. As will be explained hereinafter, the space-charge wave harmonics, with which the transverse fields of the circuits interact, are highly dispersive and coupling between the signal space-charge wave and the upper sideband frequency waves is prohibited.

It is a feature of one embodiment of this invention that the input, pump and output couplers comprise a single pair of parallel plates or "strip line" waveguide. By adjusting the frequency of beam rotation, the high dispersion of the rotating electron beam can be controlled such that apropriate space-charge wave harmonics will be in synchronism with circuit waves traveling at the speed of light. Pump and signal waves are therefore introduced at an input end to the strip line, fast wave noise is extracted at an appropriate distance downstream, and the amplified signal wave is removed at the collector end of the tube. It is, of course, possible to propagate the signal and pump waves on a slow wave circuit by controlling the dispersion of the beam, or to use separate couplers for the input, pump and output sections. The use of a single strip line, however, offers obvious simplicity of structure.

It is a feature of another embodiment of this invention that a magnetic field be produced along the length of the electron beam that reverses direction between the electron gun and the input coupler. This simple arrangement imparts a uniform rotational velocity to the electron beam while giving the known advantages of "confined flow" beam focusing. As will be explained hereinafter, the dispersion characteristics of a beam which is focused in this manner are such that the pump wave must be coupled to the beam by a quadrupole arrangement or its equivalent to insure proper synchronism for parametric amplification. This embodiment therefore comprises a pair of parallel plates for modulating the beam with signal energy, a quadrupole coupler for modulating the beam with pump energy, a drift region wherein the signal and pump waves are allowed to mix, and a pair of parallel plates for extracting amplified signal energy.

These and other objects and features of this invention can be better appreciated from a consideration of the following description, taken in conjunction with the accompanying drawings in which.

Figure 1:
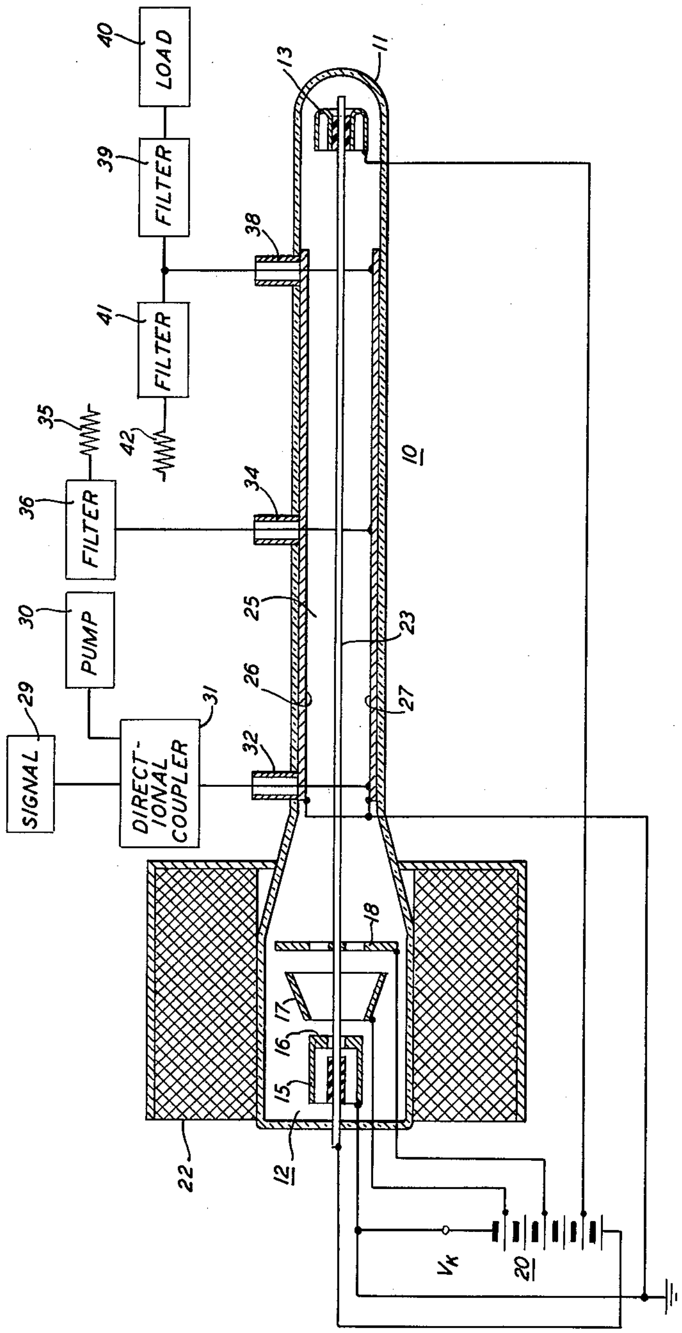
FIG. 1 is a schematic view of one embodiment of this invention.

Referring now to FIG. 1, there is shown a rotating beam space-charge wave parametric amplifier 10 comprising an elongated evacuated envelope 11 which encloses, at opposite ends, an electron gun 12 and a collector 13. For illustrative purposes, electron gun 12 is shown as comprising a cathode 15 having an annular emitting surface 16 for forming and projecting a hollow electron beam through a focusing electrode 17 and an accelerating anode 18 to collector 13. The various electrodes are biased at proper predetermined D.-C. potentials by a battery 20.

Figure 2:
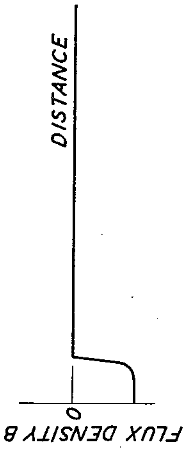
FIG. 2 is a graph of magnetic flux density versus distance in the device of FIG. 1.

Surrounding electron gun 12 is a focusing magnet 22. As will be explained more fully hereinafter, when the electron beam leaves electron gun 12, the abrupt change of magnetic field produces a torque on the beam and causes it to rotate on its path to the collector. The abrupt change of magnetic field at the terminus of magnet 22 is illustrated in the graph of FIG. 2 which is a plot magnetic flux density versus distance. An electrostatic focusing rod 23, extending along the central axis of the hollow rotating electron beam, is biased positively by battery 20 and thereby exerts a radially inward force on the electron beam to counterbalance the outward centrifugal force resulting from beam rotation.

Extending between electron gun 12 and collector 13 is a strip line waveguide 25 comprising two parallel plates, 26 and 27. Signal frequency energy from source 29 and pump frequency energy from source 30 are transmitted to strip line 25 via a directional coupler 31 and a coaxial cable 32. Signal frequency energy is then transferred to the fast space-charge mode of the rotating electron beam by the known Kompfner-Dip principle. Likewise, fast mode beam noise of the signal frequency is transferred to strip line 25 whereupon it is transmitted via a coaxial cable 34 to an impedance 35 where it is dissipated. Bandpass filter 36 permits only signal frequency energy to be transmitted to impedance 35.

Pump wave energy propagating along strip line 25 couples with the fast mode signal space-charge waves on the beam to effect parametric amplification of the signal waves. Strip line 25 is shown as being two Kompfner-Dip lengths long at the signal frequency so that the signal energy is completely retransferred back to the circuit at output coaxial cable 38. The amplified signal frequency energy is transmitted via a filter 39 to an appropriate load 40. All other circuit energy is transmitted via a filter 41 to a dissipative impedance 42. In discussing the unique interaction of the waves of the device of FIG. 1, a rather rough physical explanation will be given first, followed by a more detailed mathematical explanation.

Figure 3:
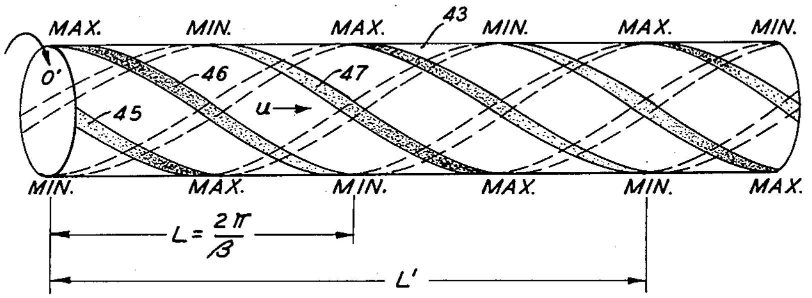
FIG. 3 is a perspective representation of the electron beam of the device of FIG. 1.

Consider the rotating electron beam as being composed of a number of elementary beams each traveling a helical path to the collector. When transverse electric fields are applied to the beam, as is done between plates 26 and 27 of FIG. 1, space-charge waves will be produced on the elementary beams. This condition is illustrated in FIG. 3 wherein an electron beam 43 rotating with an angular frequency $\dot{\theta}$ comprises three elementary beams 45, 46 and 47. Maximum concentrations of charge density (compressions) at one instant in time are labeled Max while minimum concentrations (rarefactions) are labeled Min. L′ gives the wavelength of a space-charge wave traveling along one of the elementary beams. The wavelength "seen" by an electromagnetic wave propagating externally of the beam, however, is the distance L between axially adjacent maximums or minimums. In the specific illustration of FIG. 3, it should be noted that L is one-half L′ so that the space-charge wave harmonics seen by the external wave travel at twice the phase velocity of the fundamental space-charge waves traveling in the helical paths of the elementary beams.

Figure 4:
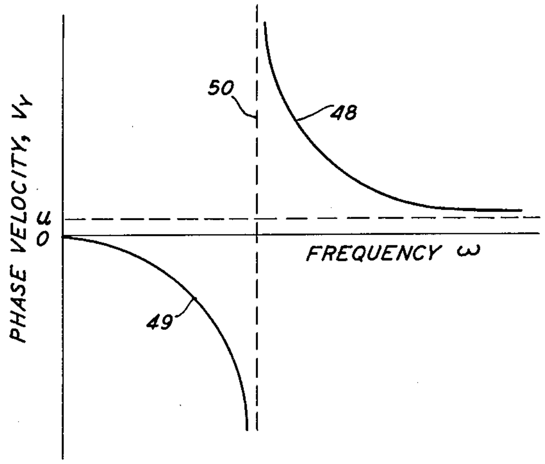
FIG. 4 is a graph of the dispersion characteristic of the electron beam of the device of FIG. 1.

It can intuitively be appreciated that the phase velocities of the space-charge wave harmonics traveling in the axial direction are functions of the beam's angular frequency $\dot{\theta}$ as well as its axial velocity $u$ and the frequency of the space-charge wave. It is therefore possible to synchronize the electromagnetic waves, traveling along strip line 25 at the speed of light, with an appropriate space-charge mode of the rotating electron beam. The high dispersion of the beam of the device of FIG. 1 is illustrated in the graph of FIG. 4 which is a plot of space-charge wave harmonic phase velocity versus frequency. Curve 48 shows the change of fast forward wave phase velocity with frequency while curve 49 represents backward wave propagation. Asymptote 50 is a function of the flux density produced by magnet 22 while asymptote $u$ represents the D.-C. beam velocity. The mixing of the signal frequency space-charge wave harmonic with the pump wave traveling on the circuit, to produce parametric amplification, follows the same general laws as apply to conventional space-charge wave parametric amplifiers.

The axial propagation constant $\beta$ of any R.-F. space-charge wave harmonic traveling along beam 43 can be computed by the expression:

$$\beta_n=\beta_e-\frac{n\dot{\theta}}{u}\pm p_n\beta_p \qquad (1)$$

where $n$ is the integral number defining the mode of excitation of the wave, $\dot{\theta}$ is the angular frequency of rotation of the beam, $u$ is the D.-C. velocity of the beam, $p$ is the plasma frequency reduction factor, $\beta_p$ the plasma propagation constant, and $\beta_e$ is equal to $$\frac{\omega}{u}$$

the ratio of wave frequency to beam velocity. The plus or minus notation denotes slow or fast wave propagation respectively. The mode number $n$ refers to the azimuthal periodicity of the wave; if one period of electric field alternation is encountered around the circumference of the beam, the mode is $n=1$; if two periods are encountered, $n=2$, etcetera. The product of the reduced plasma frequency number and the plasma propagation constant is the reduced plasma propagation constant which is generally given the notation $\beta_q$. The derivation of Equation 1 is quite lengthy and, for purposes of simplicity and conciseness, has been omitted.

The two general conditions for parametric amplification are well known in the art and can be shown to be:

$$\omega_p=\omega_s+\omega_i \qquad (2)$$

$$\beta_p=\beta_s+\beta_i \qquad (3)$$

where $\omega_p$ is the pump frequency, $\omega_s$ is the signal frequency, $\omega_i$ is an idler frequency which is defined by Equation 2, and $\beta_{(p,s,i)}$ are the propagation constants of the pump, signal and idler waves, respectively. Combining Equations 2 and 3 and using the relation $$\beta=\frac{\omega}{v}$$

gives:

$$\beta_s+\beta_i=\frac{\omega_s+\omega_i}{v_p} \qquad (4)$$

where $v_p$ is the phase velocity of the pump wave. In the parametric amplifier 10 of FIG. 1, the pump wave travels at the speed of light, so the dispersion of the beam must be adjusted such that:

$$\beta_s+\beta_i=\frac{\omega_s+\omega_i}{c} \qquad (5)$$

where $c$ is the velocity of light. When the variables of Equation 1 satisfy the requirements of Equation 2 and 5, the amplifier 10 will function as intended.

The magnet 22 of amplifier 10 turns out to be a simple device for controlling beam dispersion to satisfy the aforementioned conditions. It can be shown that the frequency of beam rotation is determined by:

$$\dot{\theta}=\frac{\eta B}{2} \qquad (6)$$

where B is the flux density produced by magnet 22, and $\eta$ the charge-to-mass ratio of an electron. The plasma propagation constant can be shown to be:

$$\beta_p=\frac{\eta B}{\sqrt{2}u} \qquad (7)$$

and, from Equation 1:

$$\beta_n=\beta_e-\frac{\eta B}{2u}(n\pm p_n\sqrt{2}) \qquad (8)$$

A simple strip line excites the electron beam solely in the $n=1$ mode and so, in applying Equation 8 to amplifier 10, $n$ equals 1. For a small ratio of beam diameter to the distance between plates 26 and 27, with $n$ equalling 1, $p$ approximately equals .707, and the propagation constant of a fast wave is:

$$\beta_{fast}\cong\beta_e-\frac{\eta B}{u} \qquad (9)$$

Combining Equations 5 and 9 gives the general condition for parametric amplification:

$$\frac{\omega_s+\omega_i-2\eta B}{u}\cong\frac{\omega_s+\omega_i}{c} \qquad (10)$$

It is relatively easy to adjust $u$ and B to fulfill Equation 10.

It should be reiterated that the device of FIG. 1 is merely an illustrative embodiment of this invention. Equations 1 and 4 can be fulfilled by a variety of combinations of elements to give parametric amplification. Various kinds of waveguides can be used to excite the beam in any of various transverse modes and to propagate waves at any desired velocity. Further, other known methods can be used for imparting a uniform rotational velocity component to the beam. Another illustrative embodiment is shown in FIG. 5.

Figure 5:
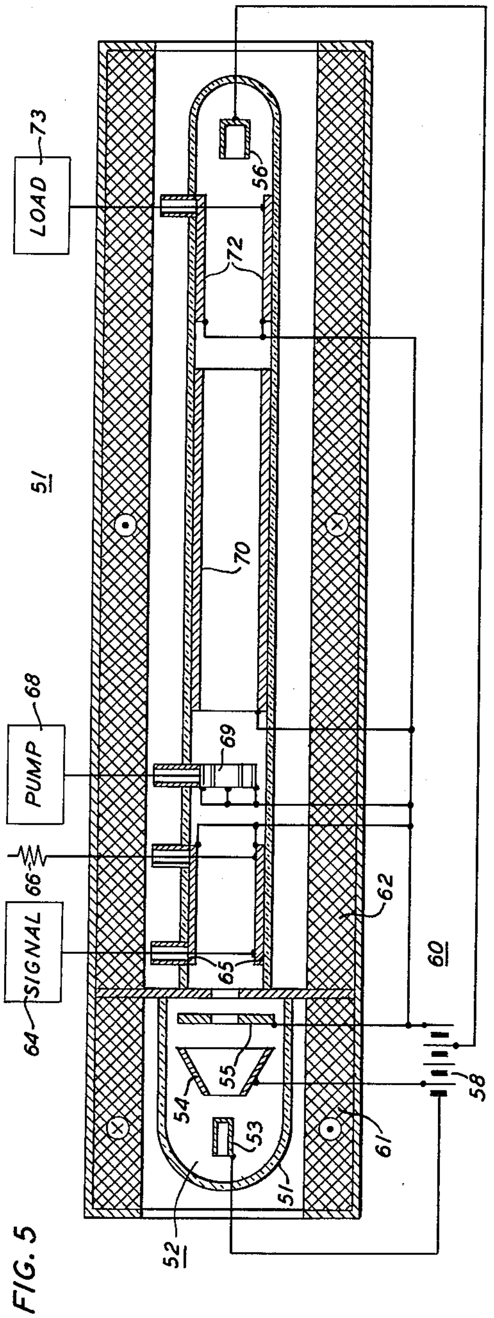
FIG. 5 is a schematic view of another embodiment of this invention.

Referring now to FIG. 5, there is shown a parametric amplifier 51 comprising an electron gun 52 having a cathode 53, focusing electrode 54, and accelerating electrode 55, and a collector 56. Cathode 53 is shown as being of the type which forms and projects a solid cylindrical beam of electrons. The various electrodes are biased by a battery 58.

Figure 6:
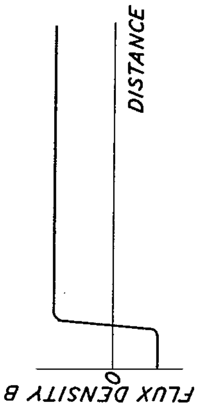
FIG. 6 is a graph of magnetic flux density versus distance in the device of FIG. 5.

The electron beam is focused by an electromagnet 60 comprising coils 61 and 62 which are wound in opposite directions. The directions of current in the windings are shown by crosses which indicate current going "into the paper" and dots which indicate current coming "out of the paper." The abrupt change of direction of current in magnet 60 produces a change in direction of flux density throughout the device which is illustrated in FIG. 6. This change produces a uniform rotational velocity component on the electron beam.

Figure 7:
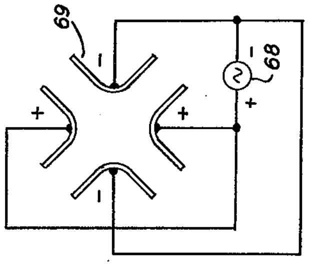
FIG. 7 is a front schematic view of the quadrupole coupler of the device of FIG. 5.

Signal energy from source 64 is transmitted to a short strip line 65 which is of an appropriate Kompfner-Dip length to effect a substantially complete transfer of signal energy to the fast mode of the rotating beam. Noise energy of the signal frequency is extracted by strip line 65 and transmitted to impedance 66 where it is dissipated. Pump energy from source 68 is transmitted to a quadrupole coupler 69 which excites the rotating electron beam in the $n=2$ mode. FIG. 7 is a schematic representation of quadrupole 69 which has been included to show how it is excited. Note that at any instant in time, the azimuthal periodicity $n$ within the quadrupole is equal to 2. Because quadrupole 69 is not of a Kompfner-Dip length, the beam is excited in both the fast and slow beam modes in a manner analogous to beam excitation by a single-gap cavity resonator.

Downstream from the pump coupler is a drift tube cylinder 70 wherein the fast mode pump and signal frequency space-charge wave harmonics are allowed to mix in the same general manner as described previously. The fast mode parametrically amplified signal wave is then extracted by an output strip line 72 which is of an appropriate Kompfner-Dip length and is then transmitted to a load 73. Inasmuch as the beam is focused by a magnetic field, couplers 65, 69, 70 and 72 are biased to an appropriately high positive D.-C. potential by battery 58 to maintain proper beam velocity.

When the beam is made to rotate by a magnetic field that reverses direction, but is of substantially constant magnitude, as shown by FIG. 6, the frequency of beam rotation can be shown to be:

$$\dot{\theta}=\eta B \qquad (11)$$

When the plasma frequency is negligible compared to $\eta$B, Equation 1 reduces to:

$$\beta_n=\beta_e-\frac{n\dot{\theta}}{u} \qquad (12)$$

Combining Equations 11 and 12:

$$\beta_n = \beta_e - \frac{n\eta B}{u} \qquad (13)$$

In amplifier 60 of FIG. 5, the signal and idler waves are excited in the $n=1$ mode so that from Equation 13:

$$\beta_s + \beta_i = \frac{\omega_s + \omega_i - 2\eta B}{u} \qquad (14)$$

The pump wave, however, is excited in the $n=2$ mode. Setting $\omega_p = \omega_s + \omega_i$, from Equations 13 and 14:

$$\beta_p = \frac{\omega_s + \omega_i}{u} - 2\eta\beta = \beta_s + \beta_i \qquad (15)$$

Hence, the conditions for parametric amplification in amplifier 60 are met if the pump wave is excited in the $n=2$ mode while the signal wave is excited in the $n=1$ mode.

As can be appreciated from the foregoing description, the space-charge wave harmonics that can be excited on a rotating electron are highly dispersive. Further, such space-charge waves can be synchronized with transverse electromagnetic waves propagating at the speed of light; this permits the use of very simple tube structure. It is to be understood, however, that the embodiments described are merely illustrative of the inventive concepts involved. Various other arrangements may be made by those skilled in the art without departing from the spirit and scope of this invention.

What is claimed is:

1. An electron discharge device comprising means for forming and projecting an electron beam, said beam being characterized by fast and slow modes of space-charge wave propagation, means for imparting a substantially uniform rotational velocity component to said beam, a source of signal frequency wave energy, a source of pump frequency wave energy, means comprising a pair of parallel plates for causing signal wave energy to propagate along said beam as a fast space-charge wave, means for propagating pump wave energy in coupling relationship to said beam, and means for extracting fast mode signal frequency energy from said beam.

2. An electron discharge device comprising an electron gun for forming and projecting an electron beam, a collector for collecting said beam, a magnet surrounding said electron gun only, electrostatically biased means extending from said electron gun to said collector for focusing said beam, and means comprising a single pair of parallel plates for causing signal frequency energy to propagate along said beam as a fast space-charge wave, for extracting fast space-charge wave noise energy from said beam, for propagating pump frequency energy in coupling relationship with said beam, and for extracting fast space-charge wave signal frequency energy from said beam.

3. A parametric amplifier comprising means for forming and projecting an electron beam, said beam being characterized by fast and slow modes of space-charge wave propagation, means for imparting a substantially uniform rotational velocity component on said beam, a source of signal wave energy, a source of pump wave energy, means for propagating electric feld components of said signal wave that are transverse to said beam in coupling relationship to the fast space-charge mode of said beam, the propagation constant of said signal wave as it propagates along said propagating means being substantially equal to the ratio of the signal frequency to the mean beam velocity minus the ratio of the frequency of said beam rotation to the mean beam velocity minus the reduced plasma propagation constant of said beam, means for propagating pump wave energy in coupling relationship to the fast space-charge mode of said beam, and means for extracting fast mode signal wave energy from said beam.

4. The parametric amplifier of claim 3 wherein the propagation constant of said pump wave in said pump wave propagation means is substantially equal to the ratio of the pump frequency to the mean beam velocity minus the ratio of the frequency of beam rotation to the mean beam velocity minus the reduced plasma propagation constant of said beam.

5. The parametric amplifier of claim 3 wherein the propagation constant of said pump wave in said pump wave propagation means is substantially equal to the ratio of the pump frequency to said mean beam velocity minus twice the ratio of the frequency of beam rotation to the mean beam velocity minus the reduced plasma propagation constant of said beam.

6. An electron discharge device comprising an electron gun for forming and projecting an electron beam, a collector for collecting said beam, a source of signal wave energy, a source of pump wave energy, an input coupler comprising a pair of parallel plates in close proximity to said beam and in electrical connection to said signal wave source, a quadrupole structure substantially surrounding said beam and in electrical connection to said pump wave source, an output coupler comprising a pair of parallel plates between said quadrupole structure and said collector, a drift tube cylinder between said quadrupole structure and said output coupler, means for producing a first substantially uniform magnetic field in said electron gun, and means for producing a second substantially uniform magnetic field which extends between said input coupler and said collector, said second magnetic field being of substantially the same magnitude, but opposite in direction, as the first magnetic field.

No references cited.